United States Patent [19]
Karwowski et al.

[11] Patent Number: 5,731,029
[45] Date of Patent: Mar. 24, 1998

[54] METHOD FOR MAKING JERKY PRODUCTS

[75] Inventors: Jan Karwowski, Franklin Lakes; Felice Scaglione, Hasbrouck Heights; John W. Stevenson, Wharton; Spencer W. Sullivan, Wyckoff, all of N.J.

[73] Assignee: Nabisco Technology Company, Wilmington, Del.

[21] Appl. No.: 509,320

[22] Filed: Jul. 26, 1995

[51] Int. Cl.$^6$ ..................................................... A23L 1/317
[52] U.S. Cl. ........................... 426/646; 426/513; 426/805
[58] Field of Search ........................................ 426/646, 513, 426/805

[56] References Cited

U.S. PATENT DOCUMENTS

| | | |
|---|---|---|
| 1,129,868 | 3/1915 | Hoy . |
| 2,897,745 | 8/1959 | Nichols et al. . |
| 3,574,633 | 4/1971 | Flier . |
| 4,011,346 | 3/1977 | Ernst . |
| 4,054,674 | 10/1977 | Barker et al. . |
| 4,229,485 | 10/1980 | Brown et al. . |
| 4,239,785 | 12/1980 | Roth . |
| 4,302,173 | 11/1981 | Persson . |
| 4,454,163 | 6/1984 | Gellman et al. . |
| 4,454,164 | 6/1984 | Gellman et al. . |
| 4,465,702 | 8/1984 | Eastman et al. . |
| 4,534,989 | 8/1985 | Gellman et al. . |
| 4,534,990 | 8/1985 | Gellman et al. . |
| 4,546,001 | 10/1985 | Gellman et al. . |
| 4,551,343 | 11/1985 | Gellman et al. . |
| 4,563,362 | 1/1986 | Thomas et al. . |
| 4,717,577 | 1/1988 | Constance et al. . |
| 4,743,458 | 5/1988 | Gellman et al. . |
| 4,743,459 | 5/1988 | Gellman et al. . |
| 4,743,460 | 5/1988 | Gellman et al. . |
| 4,743,461 | 5/1988 | Gellman et al. . |
| 4,868,002 | 9/1989 | Scaglione et al. . |
| 4,873,098 | 10/1989 | Banks et al. . |
| 4,883,421 | 11/1989 | Morgan . |
| 4,892,748 | 1/1990 | Andersen et al. . |
| 4,904,494 | 2/1990 | Spanier . |
| 4,904,495 | 2/1990 | Spanier . |
| 4,910,038 | 3/1990 | Ducharme . |
| 4,997,671 | 3/1991 | Spanier . |
| 5,026,572 | 6/1991 | Neiberger . |
| 5,045,339 | 9/1991 | Ducharme . |
| 5,283,077 | 2/1994 | Ray . |
| 5,286,513 | 2/1994 | Fuisz . |
| 5,286,514 | 2/1994 | Webb et al. . |
| 5,290,584 | 3/1994 | Ray . |

FOREIGN PATENT DOCUMENTS

WO 93/05666  4/1993  WIPO .

*Primary Examiner*—Arthur L. Corbin

[57] ABSTRACT

Jerky products having a high proportion of meat are produced on a mass production basis. Meat which is at least substantially frozen is comminuted and then heated to a temperature of least about 140° F. to at least partially denature protein of the meat. The cooked meat is then cooled to a temperature sufficiently low to solidify the fat which melted during the cooking step. A binding agent, most preferably a cold water soluble starch and guar gum, is admixed with the cooked meat to compensate for the loss of binding power resulting from denaturing of the protein during the cooking step. Mixing of the binding agent with the cooled, cooked meat and other ingredients such as seasonings and fillers is conducted to obtain a machinable meat-based dough. The meat-based dough may be sheeted or rotary molded to form pieces which may be baked and/or dried within a short period of time to obtain shelf stable products which are flexible and bendable without breaking and which exhibit the distinct texture and rough appearance of jerky.

33 Claims, 2 Drawing Sheets

METHOD FOR MAKING JERKY PRODUCTS

FIELD OF THE INVENTION

The present invention relates to the production of meat-based products using a rotary molder.

BACKGROUND OF THE INVENTION

Jerky products may be made from whole strips of meat or from meat which is ground and then formed into a shape. Naturally prepared jerky, also known as charqui, is generally made with cut strips of striate muscle meat and provides a distinctive, rugged, food product. The process is time consuming and the finished thickness of the jerky is established by the initial cutting of the meat.

Jerky products may also be produced from ground meat products. Generally, the ground meat composition is solidified using a freezing step for providing a loaf or sheet which can be cut into individual strips. As disclosed in U.S. Pat. No. 4,883,421 to Morgan and U.S. Pat. No. 4,868,002 to Scaglione, et al., extruders may be used to form ground beef compositions into a loaf or strip. A cuttable loaf may be made by solidifying the extruded meat dough having coextensively aligned fibers. The solidifying may be by freezing or other solidifying means such as drying, cooking, or combinations thereof with freezing.

In the process of U.S. Pat. No. 4,329,785 to Roth "ground and formed" or "chunked and formed" jerky is produced by first grinding the meat components and then blending with curing agents or seasoning. The cured or seasoned materials are then simultaneously formed to a selected thickness and chilled or frozen upon a freezer drum. The jerky is applied in a sheet of uniform thickness upon the freezer drum and the jerky is compressed upon the drum to promote heat exchange with the drum and to control the final thickness for the jerky. The frozen material is removed from the drum and the frozen or chilled sheet of jerky is cut into individual strips. The individual jerky strips are then passed through a drying chamber to thaw out the jerky strips and to dry them.

Combining non-rendered, non-dried, raw, frozen or chilled comminuted meats and other similar meat products with farinaceous material components to form an expanded snack product or a flat strip of jerky-like product using a high-temperature, short-time food extruder is disclosed in U.S. Pat. No. 5,290,584 to Ray. The jerky-like product has a starch content of about 40% to 80% by weight prior to extrusion. According to U.S. Pat. No. 5,290,584, less overall moisture is required during the extrusion process because the latent heat of vaporization of frozen meat delays the actual release of moisture while heating during the extrusion process. The individual strips of jerky-like extrudate may be tied into "dog bones" for pets.

A rotary molder is used to mold dog snacks or biscuits having a logo impressed or embossed in the dog biscuit in the process of U.S. Pat. No. 4,997,671, 4,904,494, and 4,904,495 to Spanier. The chewy dog snacks produced by the processes of these three patents may include a taste agent such as beef, liver, or poultry meat meal or powder, and meat and bone meal. The preferred meat powder is beef jerky powder and other edible proteinaceous meaty material in small particle form may be used in conjunction with the meat meal and bone meal.

The present invention provides a process for making jerky products with high meat content on a mass production basis using a rotary molder. The products contain a high proportion of meat but they may be produced without having to freeze ground meat to make it cuttable into individual strips. The jerky of the present invention may be produced in a variety of shapes such as individual strips, bone-shapes, chop shapes, triangular shapes, and the like. In addition, the pieces may be provided with logos or designs embossed in their surfaces.

SUMMARY OF THE INVENTION

The present invention provides a process for producing meat jerky products for human or canine consumption from meat products using a rotary molder. The use of a rotary molder enables the mass production of variously shaped jerky products with high meat content which may include logos or designs embossed in the surface of the product. The jerky products exhibit a distinctive, rugged appearance, are flexible, dense like naturally prepared jerky, and are shelf stable for extended periods of time.

In accordance with the method of the present invention, meat which is at least substantially frozen or non-frozen and has a moisture content of at least about 50% by weight, more generally about 65% by weight to about 75% by weight, is comminuted to obtain comminuted meat. The resulting at least substantially frozen comminuted meat or the resulting unfrozen comminuted meat is heated to a temperature of at least about 140° F. to at least partially denature protein of the meat. Denaturing the protein of the comminuted meat particles reduces stickiness of the meat and permits release of the meat from the cavities or molds of the rotary molder. However, heating of the meat to denature the protein also melts the fat which is an inherent part of the meat ingredient. The cooked meat is then cooled to a temperature sufficient to solidify the melted fat or oil. If the heated meat is not sufficiently cooled to solidify the fat, the liquid fat lubricates the mold cavities and counter-rotating rollers and causes the meat to prematurely fall out or slip from the mold cavities. Exemplary temperatures to which the at least substantially frozen comminuted meat are heated are from about 140° F. to about 185° F., preferably from about 145° F. to about 165° F., depending upon the type of meat, its water content, and its fat content. Exemplary temperatures to which the heated or cooked meat is cooled for sheeting and rotary molding are less than about 130° F., preferably less than about 115° F., and most preferably range from about 85° F. to about 100° F.

In embodiments of the invention a binding agent such as a starch, a gum, or mixture thereof, most preferably a cold water soluble starch and guar gum, are admixed with the cooked meat. The binding agents help to compensate for the loss of binding power resulting from denaturing of the protein. The binding agents as well as other ingredients such as seasoning, flavorants, humectants, stabilizing agents or preservatives, palatability agents, fillers, and the like may be admixed with the cooked meat to obtain a dough or dough-like composition. Admixing of the cooked meat with the other ingredients may be conducted during cooling of the cooked meat or after cooling of the cooked meat.

The rotary moldable compositions may comprise at least about 50% by weight meat, preferably at least about 55% by weight meat, for example from about 58% by weight to about 75% by weight, based upon the total weight of the dough. In addition, the moisture content of the doughs during rotary molding is generally at least about 30% by weight, preferably from about 35% by weight to about 50% by weight, based upon the weight of the dough. In embodiments of the invention, the amount of binding agent, preferably a cold water soluble starch and guar gum, may range from about 1% by weight to about 20% by weight, preferably from about 2% by weight to about 12% by weight, most preferably from about 3% by weight to about 10% by weight, based upon the weight of the rotary moldable dough. In embodiments of the invention, the weight ratio of the gum to the starch may range from about 0.05:1 to about 0.30:1, preferably from about 0.10:1 to about 0.20:1.

After cooling, the dough may be formed into pieces at about ambient temperatures, for example, at a temperature of about 70° F. to about 100° F. Formation of the pieces is preferably by sheeting the dough prior to rotary molding. The sheeting may be performed between counterrotating rollers. The sheet may then be fed to the rotary molder which forms pieces in a desired shape. The pieces may also be formed without sheeting. The rotary moldable meat-based doughs of the present invention may also be formed into pieces by other dough forming machines such as extruders, Formax machines, wire cutting machines, encrusting machines, rotary cutters, and the like.

The pieces may then be conveyed to an oven or dryer or a combination of an oven and dryer for reducing the moisture content of the pieces. Reduction of the moisture content to a final shelf stable water activity may be performed within about 90 minutes, preferably within about 60 minutes without any substantial skin formation or shriveling of the pieces. The final moisture content of the pieces may be less than or equal to about 30% by weight, preferably less than about 20% by weight, based upon the weight of the final meat-based product. Exemplary final moisture contents may range from about 13% by weight to about 30% by weight, generally from about 15% by weight to about 25% by weight, based upon the weight of the final meat-based product. In preferred embodiments, the pieces are baked to reduce the moisture content of the pieces to about 25% by weight to about 35% by weight, based upon the weight of the pieces. The baked pieces may then be dried in a dryer to reduce the moisture content to less than about 20% by weight, based upon the weight of the final product. The water activity or relative humidity of the jerky product may be less than about 0.85, preferably less than about 0.75, and generally from about 0.63 to about 0.73.

BRIEF DESCRIPTION OF THE DRAWINGS

The present invention is further illustrated by the accompanying drawings wherein.

DETAILED DESCRIPTION OF THE INVENTION

The present invention provides a process for making jerky products from raw meat using a rotary molder. The use of a rotary molder to shape and form the jerky products provides very high production rates because the pieces may be formed in multiple rows across a wide conveyor belt or band. In addition, a rotary molder may be used to provide a design or logo embossed upon a major surface of the molded piece. Although the raw meat is preferably provided in at least substantially frozen form so as to avoid microbial spoilage prior to processing, once the meat is ground, it is not necessary to freeze it to provide cuttability into individual strips or pieces. Unlike meat meal, raw meat has a high moisture content, a high fat content, and the protein is not denatured. To rotary mold the raw meat on a continuous basis it must be cooked to at least partially denature the protein to reduce stickiness, and the fat must be resolidified to prevent slipping out of the rotary mold cavities. In addition, the water content of the formed pieces is reduced to provide a shelf-stable product which is flexible and soft throughout its thickness. The use of significant amounts of raw meat provides a more dense or compact chewy texture and a strong meat flavor. It may also provide the distinctive rough or uneven appearance of naturally prepared jerky. In embodiments of the invention the amount of raw meat used may be at least about 50% by weight, preferably at least about 55% by weight, for example from about 58% by weight to about 75% by weight, based upon the weight of the rotary moldable dough. Higher or lower levels of meat may be employed depending upon the level of sugar or humectant utilized.

The raw meat used in the present invention may be any edible meat suitable for human consumption or consumption by canines. The meat may be non-rendered, non-dried, raw meat, raw meat products, raw meat by-products, and mixtures thereof. Whole meat pieces and comminuted or ground meat may be used in embodiments of the invention. The meat or meat products are generally supplied daily in a completely frozen or at least substantially frozen condition so as to avoid microbial spoilage. While refrigerated or chilled meat may be used, it is generally impractical to store large quantities of unfrozen meat for extended periods of time at a plant site. The frozen products provide a longer lay time than do the refrigerated or chilled products. Beef, chicken, and turkey are preferred meats for making jerky products intended for human consumption. For jerky products intended as pet foods, muscle meat, mechanically deboned beef, mechanically deboned chicken, and emulsified chicken are preferred. Emulsified chicken naturally supplies sufficient levels of calcium and phosphorus for a nutritionally balanced product.

The moisture content of the raw frozen or unfrozen meat is generally at least about 50% by weight, and most often from about 65% by weight to about 75% by weight, based upon the weight of the raw meat. In embodiments of the invention, the fat content of the raw frozen or unfrozen meat may be at least about 10% by weight, generally from about 15% by weight to about 20% by weight. In other embodiments of the invention, meat products having a fat content of less than about 10% by weight and defatted meat products may be used.

The frozen or chilled meat may be stored at a temperature of about 0° F. to about 32° F. It is generally supplied in 50 pound blocks. Upon use, the blocks may be completely frozen or at least substantially completely frozen. Thus, the outer layer of the blocks, for example up to a depth of about ¼", may be defrosted or thawed but still at a temperature of about 32° F. while the remaining inner portion of the blocks are frozen.

The term "meat" is understood to apply not only to the flesh of cattle, swine, sheep and goats, but also horses, whales and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. Likewise, the term "meat meal" refers to the finely ground, dry rendered residue from animal tissues including those dried residues embraced by the term in the aforesaid official definition of the Association of American Feed Control Officials, Incorporated. The terms "meat,", "meat by-products," and "meat meal" are understood to apply to all of those animal, poultry and marine products defined by said association.

Examples of meat which may be used are mammalian meat such as beef, veal, pork, and horsemeat, and the fleshy tissue from antelope, bison, cows, deer, elk, and the like. Poultry meat which may be used includes chicken, turkey, duck, or goose and the like. Embodiments of the invention may also utilize the flesh of fish and shell fish. Meat includes striated muscle which is skeletal or that which is found, for example, in the tongue, diaphragm, heart, or esophagus, with or without accompanying overlying fat and portions of the skin, sinew, nerve and blood vessels which normally accompany the meat flesh. Examples of meat by-products are organs and tissues such as lungs, spleens, kidneys, brain, liver, blood, bone, partially defatted low-temperature fatty tissues, stomachs, intestines free of their contents, and the like. Poultry by-products include nonrendered clean parts of carcasses of slaughtered poultry such as heads, feet, and viscera, free from fecal content and foreign matter.

Meat meal and bone meal may optionally be used in combination with the meat or meat by-products in embodiments of the present invention. Exemplary amounts of meat meal and bone meal which may be used range up to about 25% by weight, based upon the weight of the rotary moldable dough. The meat meal and bone meal provide taste and water absorption.

The meat-based dough compositions of the present invention preferably include a binding agent, such as a starch, a gum, and combinations thereof. The binding agent compensates for the reduction in binding power caused by cooking or denaturing of the meat protein. A preferred binding agent is a combination of a starch and a gum, most preferably a cold water soluble starch and guar gum.

Starches which may be used as a binding agent include ungelatinized starches, pregelatinized starches, and modified starches. Waxy starches or high amylose content starches which are either ungelatinized or pregelatinized may be used in the meat-based compositions of the present invention. Exemplary starches which may be utilized are wheat starch, corn starch, potato starch, rice starch, sorghum starch, tapioca starch, waxy corn starch, waxy rice starch, mixtures thereof, and the like.

The starch material for use in the present invention preferably, upon hydration at ambient temperature, forms a gel-like structure which is further characterized by its ability to retain moisture. The starch also preferably possesses high thermal stability so that after the starch has set, the gel substantially maintains its viscosity when it is then subjected to baking and drying conditions in a dough matrix. A preferred starch will also maintain its increased viscosity for a sufficient time period such that the spread of the dough is retarded during the baking and drying period. Exemplary preferred starch materials which may be used are cold water soluble granular starch materials.

Cold water soluble granular starch materials for use in the present invention preferably have a cold water solubility of at least 50% and most preferably at least 70%. Cold water solubility as used in characterizing the cold-water-swelling starch material is determined by mixing a known weight of starch in a measured volume of distilled water at ambient temperature with a Waring blender, centrifuging the starch suspension and weighing the residue obtained by evaporation of a measured aliquot of the supernatant liquid. The water solubility of the starch sample is expressed as % water solubles, dry substance basis (dsb). A specific procedure for measuring cold water solubility of starch samples is described in U.S. Pat. No. 4,465,702 to Eastman, et al. (assigned to A. E. Staley Manufacturing Company) at col. 11 line 49 to col. 12 line 20. This procedure is herein incorporated by reference.

Starches from different sources such as potato, corn, tapioca, wheat and rice may be used and they may have been subjected to either physical and/or chemical modification. One particular food starch or mixtures of food starches may be used. A preferred group of starches for use in the rotary moldable meat-based compositions of the present invention are those prepared from corn.

The production of cold water soluble granular starch materials which may be used in the practice of the invention is described in the above-mentioned U.S. Pat. No. 4,465,702 to Eastman, et al., which patent is herein incorporated by reference in its entirety. According to U.S. Pat. No. 4,465,702, the cold-water swelling/cold-water soluble starch materials are prepared by forming a slurry of granular ungelatinized corn starch in a liquid medium comprised of water and either ethanol, denatured ethanol, propanol or isopropanol, heating the slurry to a temperature of about 300° F. to about 360° F. at or above autogenic pressure for about 1 to about 30 minutes. The cold-water-swelling granular starch material is then separated from the processing medium by filtration, centrifugation, decantation and like means.

According to the patent, the cold-water swelling/cold-water soluble starch materials derived from ungelatinized corn starch consist essentially of substantially intact, partially swollen granules which appear nonbirefringent when viewed under a polarizing microscope and which have a cold water solubility of at least 50% and a reduced native fat content of about 0.25% or less. The ungelatinized corn starch starting material can be either chemically unmodified, i.e. not reacted with chemical modifiers, or modified chemically by reaction with various amounts of starch reactive chemical reagents such as oxidants, acids, etherifying agents and esterifying agents. The cold-gelling characteristic (i.e. the ability to set to a sliceable gel) of the granular starch materials, it is disclosed, is most prominent where the granular starch starting material has been subjected to little or no chemical modification.

A cold water swelling, granular starch for use in the present invention which is commercially available is sold under the name "MIRAGEL™ 463 Starch" and is manufactured by the A. E. Staley Manufacturing Company, Decatur, Ill. This starch is derived from corn starch. Unlike a typical pregelatinized starch which microscopically reveals particles that are swollen, fragmented and generally flake-like in shape, MIRAGEL™ 463 particles appear as whole, regular granules. It thickens and sets to a gel quickly using room temperature water. Setting of the gel typically occurs in half an hour at room temperatures and the gel strength exceeds that of conventional, cooked, common corn starches. The MIRAGEL™ 463 starch has the ability to gelatinize and set in low moisture media such as corn syrup (20% moisture) with no more than atmospheric cooking (less than or equal to 212° F.). Gels made with the starch will not melt or flow when exposed to high heat. They are heat stable, retaining form and firmness, even when held at oven temperatures of 350° F. Typically, the MIRAGEL™ 463 starch is a white powder having a moisture content of about 5%, a pH of about 5.5, an ash content of about 0.1%, a gel strength of at least 90 grams as measured on a Voland Stevens LFRA Texture Analyzer, and a cold water solubles content of at least 70% by weight. A typical screen analysis for the product is: (a) 0.1% maximum on a U.S. #30 mesh, and (b) 95.0% minimum through a U.S. #100 mesh. Edible gums which may be employed as a binding agent in the meat-based compositions include hydrocolloid gums such as alginate gum, guar gum, locust bean gum, xanthan gum, gum arabic, gum tragacanth, carrageenans, and combinations thereof. The gums absorb moisture from the meat, help to increase dough viscosity, reduce stickiness and provide cohesiveness to the dough. Guar gum is a preferred gum for use in the present invention.

The amount of binding agent such as a cold water soluble granular starch and/or gum used as a binder in making up the meat-based rotary moldable dough will depend on a number of factors. The factors include but are not limited to the amount and type of meat used, the temperature to which it is cooked or the extent to which the protein is denatured, and the amount of moisture present in the dough, and the particular binding agent. The amount of the binding agent used should be sufficient to bind water inherent in the meat and any added water so as to provide a cohesive, sheetable, rotary-moldable meat-based dough. Exemplary amounts of the binding agent range from about 1% by weight to about 20% by weight, preferably from about 2% by weight to about 12% by weight, most preferably from about 3% by weight to about 10% by weight, based upon the weight of the rotary moldable meat-based dough.

The weight ratio of gum, such as guar gum, to the starch, such as a cold water soluble starch, may range from about 0.05–0.30:1. In preferred embodiments the weight ratio of gum to starch may range from about 0.10–0.20:1.

Generally, the higher the moisture content of a given dough and the more the meat is cooked and the protein is denatured, the higher should be the amount of the binding agent such as the cold water swelling granular starch material and guar gum, which is used in the meat-based dough. The amount of water is generally determined by the inherent moisture content of the meat plus any optional water added. The amount of water present in the dough should be sufficient to provide a desired high moisture content in the final jerky product to provide a soft, flexible but chewy texture. However, the amount of water should not adversely affect dough machinability in terms of stickiness, excessive softness or loss of viscosity, or loss of sheetability or rotary moldability. Additionally, excessively high moisture contents in the dough would require prolonged baking and drying times to achieve a particular final jerky shelf-stable moisture content. Use of the starch material, such as a cold water swelling granular starch material in the soft rotary jerky products of the present invention tends to reduce dough machinability problems in high moisture content doughs. In addition, the starch materials promote moistness and flexibility in the product which lasts for periods of at least about six months, preferably at least about twelve months.

The initial moisture content of the dough may be adjusted to provide the desired consistency to the meat dough to enable proper mixing, working and shaping of the dough. The total moisture content of the dough will include any water included as a separately added ingredient, as well as the moisture provided by the meat (which usually contains about 65% by weight to about 75% by weight moisture), and the moisture provided by dough additives or ingredients included in the formulation, such as high fructose corn syrup, invert syrups, or other liquid humectants. Taking into account all sources of moisture in the dough, including separately added water, the total initial moisture content of the dough is generally at least about 30% by weight, preferably from about 35% by weight to about 50% by weight, based upon the weight of the rotary moldable meat-based dough.

The meat-based products of the present invention may also include one or more humectants which may be used to bind water, provide flexibility or bendability to the piece, enhance palatability, and augment microbial shelf stability. In embodiments of the invention, the amount of humectant may range up to about 10% by weight, generally from about 1% by weight to about 5% by weight.

Humectant sugars which may be employed alone or in combination with other sugars in the meat-based doughs include fructose, lactose, dextrose, maltose, galactose, sorbose, mannose, maple syrup, corn syrups, invert syrups, high fructose corn syrups, honey, molasses, as well as mixtures of one or more of the foregoing humectants. For example, a suitable humectant sugar composition may comprise about 0 to 85 percent sucrose, with the balance of the sugar being comprised of fructose employed in the form of crystallized sugar. Alternatively, the balance of the sugar may be provided by the sugar solids content of a corn syrup, honey or a high fructose corn syrup, or another humectant sugar.

Commercially available high fructose corn syrups, which may be used, are prepared by the enzymatic isomerization of dextrose containing corn syrups, and typically possess a sugar solids component of about 40 percent to about 100 percent by weight fructose, with the balance of the non-fructose sugar solids being primarily dextrose plus minor amounts of other monosaccharides. The sugar solids content of commercially available high fructose corn syrups typically range from about 70 percent to about 73 percent, up to about 82 percent by weight. High fructose corn syrups having at least about 80 percent by weight of their solids as fructose are preferred because of the high water-holding capacity of fructose compared to the capacities of other sugars at microbially shelf-stable water activities (i.e. less than about 0.7).

In addition to the humectant sugars, humectants, or aqueous solutions of humectants which are not sugars or possess a low degree of sweetness relative to sucrose may also be employed in the meat-based doughs. For example, glycerol, sugar alcohols such as mannitol, maltitol, xylitol, and sorbitol, and other polyols, may be used as humectants in the doughs of the present invention. Additional examples of humectant polyols (i.e. polyhydric alcohols) include humectant glycols, for example propylene glycol and hydrogenated glucose syrups. Other humectants include sugar esters, dextrins, hydrogenated starch hydrolysates, and other starch hydrolysis products.

In preferred embodiments of the invention sucrose, which is a readily crystallizable sugar, is employed in the meat-based doughs to provide sweetness and bind water without excessive stickiness, and to enhance microbial shelf stability. Brown sugar may be used as a source of sucrose as well as a source of fructose and dextrose. Exemplary amounts of sucrose, brown sugar, and mixtures thereof which may be used range up to about 20% by weight, with preferred amounts being about 2% by weight to about 15% by weight, based upon the weight of the meat-based dough.

The meat-based doughs may also include a filler. Components such as plant matter including farinaceous material, for example, soy flour, wheat germ, corn grits, soy grits, wheat gluten, textured soy protein, soy isolates, soy concentrates, albumin, and mixtures thereof may be employed as fillers. Exemplary amounts range up to about 20% by weight, generally from about 5% by weight to about 15% by weight, based upon the weight of the dough.

Additional components or ingredients conventionally used in jerky products may be employed in conventional amounts. For example seasonings and flavorings may be employed in amounts up to about 10% by weight, based upon the weight of the dough. Also, preservatives and curing agents in amounts of up to about 5% by weight, generally from about 0.2% by weight to about 3% by weight of the dough can be utilized to enhance shelf stability. Vitamin and mineral supplements can also be included in the doughs in exemplary amounts of up to about 2% by weight of the dough.

Exemplary seasoning and flavorings which may be included in the doughs of the present invention are one or more: 1) salts, such as sodium chloride and potassium chloride, 2) spices, for example, garlic, cloves, onion, chili pepper, black pepper, sweet basil, bay leaf, marjoram, parsley, sage, rosemary and thyme, 3) flavored foodstuffs, for example, cheese, cheese bits, cheese powder, eggs, egg bits, egg powder, bacon, bacon bits, and bacon powder, 4) flavorings such as bacon flavoring, fish flavoring, poultry flavoring, liquid smoke flavoring and/or airborne smoke, and 5) flavor enhancers such as monosodium glutamate.

Examples of one or more preservatives and curing agents which can be included in the doughs of the present invention are benzoic acid, the sodium and other salts of benzoic acid, the sodium, calcium and other salts (propionates) of propionic acid, sorbic acid, the potassium, calcium, sodium and other salts (sorbates) of sorbic acid, diethyl pyrocarbonate and menadione sodium bisulfate, and sodium nitrate (cure). Potassium sorbate and sodium nitrate are preferred.

An acidic substance is preferably added in conjunction with any addition of the sorbate salts and the like in order to raise the acidity which enhances the actions of the sorbate salts and the like. The preferred acidic substance for this purpose is generally lactic acid because the final product exhibits enhanced flavor. Other acids which may be used include edible organic acids such as citric acid and fumaric acid. Exemplary amounts of the acidic substance range from about 0.25% by weight to about 0.75% by weight, based upon the weight of the dough.

Minor amounts (usually no more than about 0.2 weight percent based on the fat content of the snacks) of antioxidants can optionally be used in the meat-based doughs of the present invention. Examples of antioxidants are butylated hydroxytoluene (BHT), butylated hydroxyanisole, propyl galate and ascorbyl palmitate. The antioxidant can also be placed on the interior surface of the packaging material.

The meat-jerky products of the present invention may be produced without the separate addition of fats or oils, such as lard, vegetable shortening or oil such as corn oil, soybean oil, cod liver oil, and the like for palatability or mouthfeel, because of the inherent fat content provided by the raw meat component.

Figure 1:
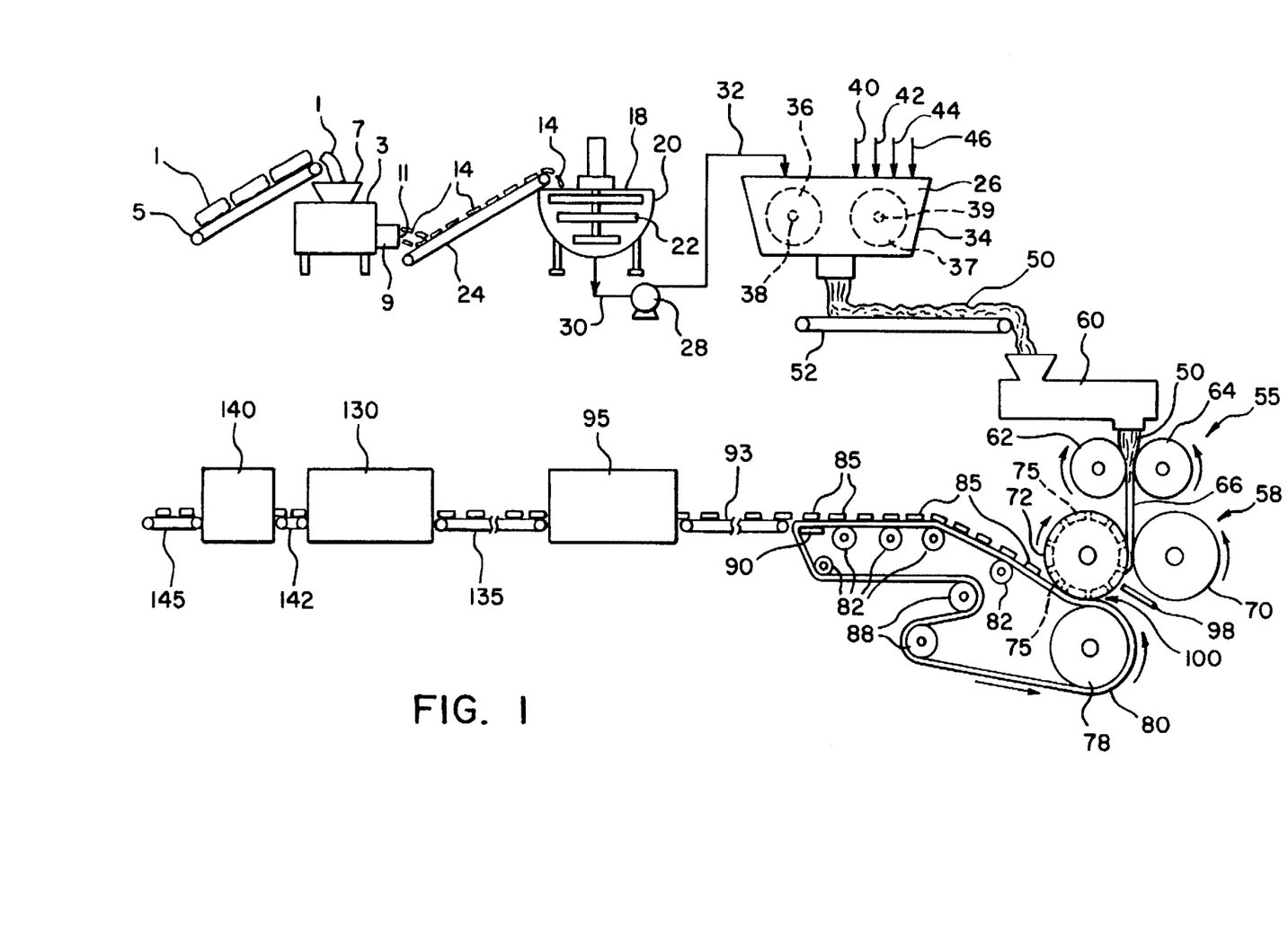
FIG. 1 shows a process flow chart of a method for making a rotary molded jerky product in accordance with the present invention.

The meat-based doughs may be prepared by comminuting or grinding completely frozen, substantially frozen, or unfrozen meat to obtain comminuted meat. A process flow chart illustrating a method for producing a rotary molded jerky product in accordance with the present invention is illustrated in FIG. 1. As shown in FIG. 1, frozen blocks of meat 1 may be ground in a conventional meat grinder 3. A conventional continuous conveyor belt 5 may be used to transport the blocks 1 to the meat grinder 3. The meat grinder 3 may comprise a hopper 7 for feeding the blocks 1 of frozen raw meat to a single or twin-screw feeder 9. The rotating screw or screws convey, chop, and grind the frozen blocks 1 and force the frozen meat through a die plate 11 having a plurality of holes. The diameter of the holes may range, for example, from about ⅛ inch to about ⅝ inch.

The at least substantially frozen extrudate ropes 14 may then be conveyed to a cooking device 18. A steam jacketed kettle 20 equipped with a mixer 22 is preferred. However, other mixing devices, such as kneaders and low speed, low agitation mixers, can be used. A preferred steam jacketed agitated cooker is equipped with spring loaded scrapper blades so as to prevent scorching of the meat as it is cooked.

The frozen meat ropes 14 may be fed to the cooker 18 by means of a continuous conveyor belt 24, screw-type conveyor or other conventional conveying means. The chopped meat or broken strands of frozen meat 14 may generally enter the cooker 18 at a temperature of about 25° F. to about 32° F. The at least substantially frozen meat 14 may be heated in the agitated cooking vessel 18 until its temperature reaches at least about 140° F. The meat is heated at temperatures of at least about 140° F. so to at least partially denature the protein of the meat and brown it. In embodiments of the invention, the cooking is conducted so as to denature the protein at least upon the surface of the comminuted meat particles, and preferably to a substantial depth within the comminuted meat particles. Denaturing of the protein and browning, in embodiments of the invention, may also be conducted throughout the comminuted meat particles. Generally, the denaturing of the protein or cooking of the meat should be conducted so as to reduce stickiness of the meat. The extent of denaturing or cooking should permit sheeting of the meat and its release from the cavities or molds of a rotary molder. Exemplary cooking temperatures may range from about 140° F. to about 185° F., preferably from about 145° F. to about 165° F. Exemplary cooking times may range from about 5 minutes to about 30 minutes, preferably from about 10 minutes to about 15 minutes.

The cooking is preferably conducted at about atmospheric pressure although subatmospheric and superatmospheric pressures may be used. In embodiments of the invention, cooking under a vacuum may be used to remove a portion of the water inherent in the raw meat. For example, from about 3% by weight to about 15% by weight of the water inherent in meat may be removed during vacuum cooking so as to reduce subsequent baking and/or drying times.

The cooked meat may then be transferred, preferably by pumping, from the cooking vessel 18 to a cooling device 26. A pump 28 may be used to conduct the cooked meat slurry via lines 30 and 32 to the cooling device 26. The cooling device 26 is preferably a jacketed vessel 34 equipped with at least one agitator or mixer. Counterrotating agitators 36, 37 comprising paddles which are longitudinally and circumferentially spaced about counter-rotating shafts 38, 39 are preferred. Conventional jacketed mixers or blenders, such as manufactured by Littleford may be used.

The cooked meat, which is slurry-like in consistency, is cooled in the cooling vessel 26 to obtain a dough-like consistency. The cooling should be sufficient to solidify the fat which melts or liquefies during the cooking stage. If the heated meat is not sufficiently cooled to solidify the fat, the meat dough is difficult to sheet due to slippage between counter-rotating rollers. In addition, the liquid fat lubricates the mold cavities and causes the meat-based dough to prematurely fall out or slip from the mold cavities of the rotary molder. Temperatures to which the heated or cooked meat are cooled for sheeting and rotary molding will depend upon the melting point or SFI profile (solid fat indices) of the fat. Generally, the cooked meat is cooled to temperatures of less than about 130° F., preferably less than about 115° F., and most preferably range from about 85° F. to about 100° F.

The remaining ingredients may be admixed with the cooked meat prior to, during, or after cooling of the cooked meat. The remaining ingredients are preferably added at ambient temperature and help to reduce the temperature of the cooked meat. In embodiments of the invention, the meat mass may be cooled to temperatures of about 90° F. to about 100° F., the remaining ingredients may be admixed with the partially cooled meat mass, and then cooling and mixing may be continued to obtain at least substantial homogeneity and a dough-like consistency for sheeting and rotary molding. The rotary molding may be performed without sheeting as well.

The binding agents may be added separately or together to the cooked meat. Generally, separate addition of the binding agents is preferred to promote more even hydration of each binding agent and to avoid lumping. In preferred embodiments of the invention, a starch binding agent 40, such as a cold water soluble starch is admixed with the cooled, cooked meat in the cooling device 26. Adding the starch binding agent first promotes substantially uniform hydration of the starch by absorption of water from the meat mass. Hydration of the starch and mixing it with the meat mass reduces stickiness and promotes attainment of a cohesive dough. Other binding agents, such as a gum, may then be added. For example, guar gum may be added with the remaining dry ingredients 42. The liquid ingredients 44 may then be admixed with the blend or mixture of dry ingredients and cooked meat in the cooling device 26. The filler material 46, such as soy grits or other high water holding capacity components, is preferably added last so as to not interfere with hydration of the starch binding agent or gum. The dry ingredients 42 may be added individually or as a preblend. Likewise, the liquid ingredients 44 may be added individually or as a preblend. Mixing may then be continued so as to obtain an at least substantially homogeneous at least partially cooked meat-based dough 50.

The meat-based doughs of the present invention may be formed into snack-size pieces by rotary molding or by other dough forming machines such as extruders, Formax machines, wirecutters, encrusting or enrobing machines, such as a Rheon Manufacturing Co. encrusting or enrobing device for making filled products, or a rotary cutter. Use of a rotary molder to form the dough into individual pieces is preferred. The pieces may be formed into pieces at ambient temperatures, for example, at temperatures of from about 70° F. to about 100° F.

As shown in FIG. 1, the dough 50 may be conveyed or transported from the cooling and mixing device 26 by means of a conventional conveyor 52, such as a continuous belt conveyor, preferably to a sheeting device 55 and then to a rotary molder 58. The cooled dough may be sent directly to the rotary molder 58 without first being sheeted. Most preferably, as shown in FIG. 1, the meat dough 50 is sheeted between conventional, counter-rotating sheeting rolls 62, 64 prior to rotary molding. The thickness of the dough sheet may be about the same as the thickness of the dough pieces formed from the dough sheet. Formation of the sheet 66 facilitates consistent feeding of the dough 50 to the rotary molder 58. In preferred embodiments, the meat dough 50 is passed through a kibbler 60 prior to sheeting and prior to rotary molding so as to eliminate lumps.

Commercially available rotary molders may be used in the apparatus of the present invention, such as those produced by Weidenmuller Co., Morton Grove, Ill. Generally, rotary molders include a feed hopper for feeding of a dough mass to a rotating feed drum. In embodiments of the invention, as shown in FIGS. 1, 2, 3, and 4 the feed hopper is not utilized. As shown in FIGS. 1, 2, 3, and 4, the rotary molding apparatus 58 generally comprises a rotating feeding drum or roll 70. The rotating feeding drum 70 can be corrugated or provided with a plurality of peripheral transverse ribs (not shown) for feeding purposes. The rotating feed drum 70 is mounted on bearings supported on a frame (not shown). Positioned adjacent to and in peripheral contact with the rotating feeding drum 70 is a rotary molding drum or die roll 72. The rotary molding drum 72 is provided with a plurality of molding cavities 75 positioned in a particular arrangement about the peripheral surface of the rotary molding drum 72. The rotary molding drum 72 is rotatably mounted on bearings supported by the frame (not shown). Positioned beneath the rotary molding drum 72 is a pressing drum or forming roll 78. The pressing drum or forming roll 78 is mounted on bearings supported on the frame (not shown).

A continuous web conveyor 80 is supported on a plurality of guide rollers 82 and fed between the rotary molding drum 72 and the pressing drum 78 as shown in FIGS. 1, 2, 3, and 4. The continuous web conveyor 80 may be made of a fabric-type composite material with which the individual dough pieces 85 being formed preferentially adhere verses the inner surfaces of the molding cavities 75 in order to remove the individual pieces therefrom. The individual dough pieces 85 effectively adhere to the continuous web conveyor 80 to maintain substantially the same pattern or alignment of the individual pieces 85 as they had in the cavities 75 of the rotary molder die roll 72. The drums 70, 72, and 78 of the rotary molding apparatus 58 and the continuous web conveyor 80 may be driven by conventional drives (not shown).

As shown in FIG. 1, rotary molding apparatus 58 may include a tensioning device comprising tensioning rollers 88. Further, the continuous web conveyor 80 may be fed over a blade or noser 90 for discharging the individual dough pieces 85 onto another conveyor 93 leading, for example, to a baking oven 95.

Figures 2, 3, 4:
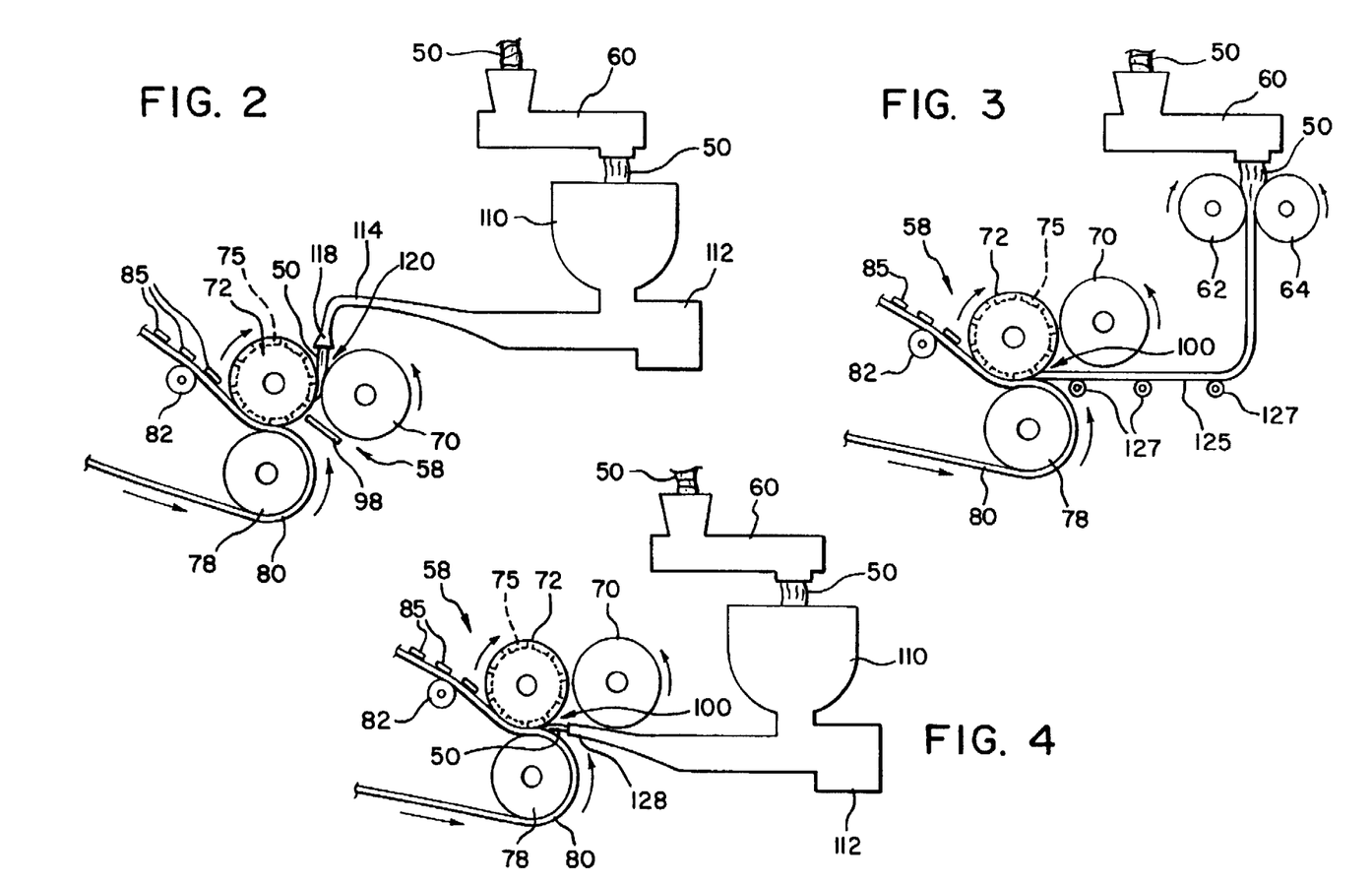
FIG. 2 shows an embodiment of the present invention wherein a meat dough is fed to the nip of the die roll and feed roll of a rotary molder using a spreading nozzle.
FIG. 3 shows an embodiment of the present invention wherein a meat dough is fed to the nip of the die roll and forming roll of a rotary molder as a sheet formed by counterrotating sheeting rolls.
FIG. 4 shows an embodiment of the present invention wherein a spreading nozzle or sheeting nozzle is used to feed a meat dough to the nip of the die roll and forming roll of a rotary molder.

As shown in FIGS. 1 and 2, the dough 50 is fed into the molding cavities 75 of the rotary molding drum 72 by the rotating feeding drum 70. A wiper or scraper blade 98, as shown in FIGS. 1 and 2, may be used to remove any excess dough material extending above the molding cavities 75. The individual dough pieces formed in the molding cavities 75 are transferred into and through the nip 100 between the rotary molding drum 72 and pressing drum 78 to enable transferring and adhesion of the dough pieces 85 to the continuous web conveyor 80.

The individual dough pieces 85 may be transferred from the rotary molding apparatus 58 to the oven 95 in the particular arrangement dictated by the spatial arrangement of the molding cavities 75 on the peripheral surface of the rotary molding drum 72.

In embodiments of the present invention, as shown in FIG. 2 the dough 50 may be fed from the kibbler 60 to an agitated hopper 110 equipped with a motor drive 112 and feed screw (not shown). The dough 50 may be fed via a conduit 114 to a spreading nozzle 118 positioned above the rotary molder 58. The spreading nozzle 118 spreads or distributes the meat dough 50 along the length of the counter-rotating feed roll 70 and die roll 72 of the rotary molder 58 for feeding into the nip 120 of the feed roll 70 and die roll 72.

In embodiments of the invention, as shown in FIGS. 3 and 4, the dough 50 may be fed directly to the nip 100 between the die roll 72 and forming roll 78 without being fed to the feed roll 70. This procedure provides a more straight through or horizontal, shorter feed path which helps to reduce feeding problems caused by slipperiness or stickiness. The procedure is particularly advantageous for the rotary molding of softer doughs, or dough-like emulsions at elevated temperatures. The dough 50 may be first sheeted and then the dough sheet 125 may be fed, using support rollers 127, to the nip 100 by counterrotating sheeting rollers 62, 64 as shown in FIG. 3. As shown in FIG. 4, the dough 50 from the kibbler 60 may be fed to an agitated hopper 110 equipped with a motor drive 112 as in the embodiment of FIG. 2. The dough 50 may be fed to the nip 100 between the die roll 72 and forming roll 78 by a spreading or sheeting nozzle 128.

The rotary molder 58 forms the dough mass or dough sheet which is fed to it into shaped or molded pieces 85. The pieces take on the shape of the individual molds or cavities 75 of the die roll or molding roller 72. The pieces 85 also take on an impression or embossment from the molds or dies 75 of the rotary molder 58. The forming roll 78 of the rotary molder 58 presses the dough into the individual molds or cavities 75 to form the individual pieces 85. The individual molded pieces 85 are removed from the molds or cavities 75 of the die roll 72 by the continuous belt 80 which passes around the forming roll 78 and between the nip 100 of the forming roll 78 and die roll 72.

As shown in FIG. 1, the individual pieces 85 may then be transferred from the belt 80 to the transfer belt 93 for conveying to an oven or dryer. Preferably a combination of an oven 95 and dryer 130 is used for moisture reduction as shown in FIG. 1. The pieces are preferably conveyed to the oven and dryer by means of continuous open mesh belts 93 and 135, respectively. The dried product may be conveyed to a cooling tunnel 140 by means of a continuous belt conveyor 142. The cooled product may then be transported on a belt conveyor 145 to a packaging operation (not shown).

The moisture content of the rotary molded pieces 85 upon entering the oven and/or dryer may be essentially the same as the moisture content of the dough formed in the agitated cooling vessel 26. The moisture content of the pieces 85 may be reduced to a shelf stable level using at least one oven, or at least one dryer, or preferably both an oven and dryer. The moisture reduction is conducted at temperatures which do not cause the pieces to shrivel and form a skin or puff. The use of a dryer alone usually results in extended drying times of 4 to 5 hours or more dependent on drying temperatures. The use of a staged dryer helps to substantially reduce drying times. Baking or drying in the oven is generally performed on the pieces arranged as a monolayer which promotes even and relatively quick moisture reduction in the pieces. Moisture reduction may then be continued in a dryer where the pieces may be dried in multiple layers. In embodiments of the invention, a multistage dryer may be used without incorporation of an oven.

The final moisture content of the baked and/or dried meat-based products of the present invention may be less than or equal to about 30% by weight, preferably less than about 20% by weight, based upon the weight of the final meat-based product. In preferred embodiments of the invention, the pieces are first baked or dried in an oven to reduce the moisture content of the pieces down to about 25% by weight to about 35% by weight, based upon the weight of the pieces. Generally, the moisture content is reduced by at least about 8 percentage points, preferably from about 10 to about 12 percentage points in the oven. For example, rotary molded pieces 85 having a moisture content of about 40% upon entry into the oven 95 preferably have their moisture content reduced to less than about 30% by weight. The baking or drying in the first stage, where the pieces may be arranged in a single layer as rows, helps to provide firmness to the rotary molded dough pieces. The increased firmness helps to retain product integrity during subsequent operations where the pieces form a bed or multiple, contacting layers, such as tumbling in a dryer. Exemplary baking temperatures are at least about 225° F. and preferably range from about 230° F. to about 275° F. Exemplary baking times range from about 10 minutes to about 50 minutes, preferably from about 12 minutes to about 25 minutes.

Conventional baking ovens may be used for baking the rotary molded meat-based dough pieces. Multi-zoned band ovens which are gas fired and are equipped with top and bottom heating means are preferred. The baking oven is preferably equipped with a continuous open mesh band.

Drying may be performed in a conventional dryer, such as a continuous belt dryer or oven, and the like. The moisture content of the baked pieces exiting the oven 95 may be further reduced in the dryer 130 to their final moisture content which is generally less than or equal to about 30% by weight, preferably less than about 20% by weight, based upon the weight of the final jerky product. The drying is conducted to an extent so as to result in a shelf stable product without adversely affecting flexibility, texture, or palatability. For example, the moisture content of the pieces exiting the dryer 130 may range from about 13% by weight to about 30% by weight, generally from about 15% by weight to about 25% by weight, based upon the weight of the final product. Moisture reductions of at least about 8 percentage points, preferably from about 10 to about 12 percentage points may be achieved in the dryer 130.

Drying temperatures generally range from about 210° F. to about 235° F., preferably from about 220° F. to about 230° F. Drying times generally range from about 30 minutes to about 75 minutes, preferably from about 35 minutes to about 60 minutes.

Generally, the total amount of time for reducing the moisture content of the rotary molded pieces to the final product moisture content is less than about 90 minutes, preferably less than about 60 minutes, whether an oven or dryer or both are used.

The dried product may be cooled in a conventional cooling tunnel or dryer zone 140 to about atmospheric temperature, for example, from about 70° F. to about 90° F. and then packaged in moisture-proof bags.

The final meat-based products of the present invention may have a water activity or relative humidity of less than about 0.85, preferably less than about 0.75, and generally from about 0.63 to about 0.73 and include semi-moist meat-based products. Products having a water activity or relative humidity greater than about 0.7 preferably contain a preservative or antimycotic to assure microbial shelf stability. Exemplary moisture contents range from about 13% by weight to about 30% by weight, generally from about 15% by weight to about 25% by weight, based upon the weight of the final meat-based product. The jerky products of the present invention exhibit shelf stability under unrefrigerated conditions of at least about six months, preferably at least about twelve months in proper moisture proof packaging, such as foil-lined bags.

The rotary molded jerky products of the present invention may be produced in a variety of shapes such as bone shaped, chop shaped, round, triangular, chicken bone shaped, square, rectangular, strip shaped, and the like. The different shapes may be produced simultaneously by using variously shaped molds or cavities upon a single die roll. Furthermore, the pieces may be embossed or impressed with a logo or design contained in the cavities or molds of the die roll.

The present invention is further illustrated by the following examples wherein all parts, percentages and ratios are by weight and all temperatures are in ° F. unless indicated to the contrary:

EXAMPLE 1

The ingredients and their relative amounts which may be used to produce a beef-based jerky canine snack are:

| Ingredients | Weight % |
|---|---|
| Mechanically Deboned Beef | 66.48 |
| Soy Grits, 80-0 | 8.00 |
| MIRAGEL ™ Starch #463 | 3.50 |
| Sucrose | 13.00 |
| Seasoning Blend* | 5.36 |
| Smoke Flavor | 1.50 |
| Propylene Glycol | 1.50 |
| Liquid Lactic Acid | 0.50 |
| Sodium Nitrite (Cure) | 0.16 |
| | 100.00 |

| *Seasoning Blend | Weight % |
|---|---|
| Salt | 46.27 |
| Dextrose | 29.82 |
| Guar Gum | 9.64 |
| Garlic Powder | 11.18 |
| Potassium Sorbate | 2.98 |
| Coloring | 0.07 |
| BHA | 0.04 |
| | 100.00 |

The mechanically deboned beef, supplied in frozen blocks of about 50 pounds each, may be conveyed into a meat grinder for comminuting into strands or ropes of frozen meat having a diameter of about 3/16 of an inch. The temperature of the ground frozen meat may be about 10° F. to about 30° F. and it may have a moisture content of about 70% by weight, and a fat content of about 17% by weight. The strands or ropes of frozen meat may be conveyed from the meat grinder to a steam-jacketed kettle. The kettle may be equipped with a mixing device having spring-loaded scrapper blades to prevent scorching of the meat as it is heated and mixed in the kettle. The frozen strands of meat may be mixed and heated in the kettle until it reaches a temperature of about 150° F. The browned meat containing denatured protein is slurry-like and may be pumped while hot to a Littleford jacketed mixer.

The cooked meat mass may be cooled in the jacketed mixer to a temperature of about 90° F. to about 100° F. The cold water soluble starch (MIRAGEL™ #463) may then be added to the cooled meat slurry with continued mixing to substantially completely hydrate the starch and form a substantially homogeneous mixture. Then the sucrose, the seasoning preblend, and the sodium nitrite may be added with continued mixing. Next, the liquid ingredients which are the smoke flavor, propylene glycol, and liquid lactic acid may be added with continued mixing. Finally, the soy grits may be added and the mixture may be mixed to obtain a substantially homogeneous dough-like consistency. After addition of all of the ingredients, the temperature of the meat-based dough may range from about 85° F. to about 95° F. The cooled meat-based dough may have a moisture content of about 47% by weight, based upon the weight of the meat dough.

The meat dough may then be transferred to a kibbler for breaking any lumps which may be present in the dough. The dough may then be sheeted between counter-rotating rollers to obtain a dough sheet. The dough sheet may then be fed to the nip of the die roll and feed roll of a conventional rotary molder. The rotary molder may have a plurality of bone-shaped cavities or molds arranged along its length and around its circumference. The rotary molder forms the dough into bone-shaped pieces having a design embossed upon their surfaces.

The rotary molded pieces may then be conveyed in a monolayer pattern from the rotary molder to a baking oven or multi-zone dryer equipped with an open mesh continuous belt. Upon entering the baking oven the moisture content of the pieces may be about 46% to about 47% by weight, based upon the weight of the dough pieces. The pieces, arranged in rows, may be baked in the oven at a temperature of about 250° F. for about 7 to 10 minutes to reduce the moisture content of the pieces to about 26% by weight to about 28% by weight, based upon the weight of the pieces. The pieces, still arranged in monolayer form, may be transferred from the oven to a dryer where they are arranged in a multilayer bed. The pieces may be dried at a temperature of about 225° F. for about 40 minutes to about 50 minutes to obtain pieces having a water activity or relative humidity of about 0.63 to about 0.73 and a water content of about 16% by weight to about 22% by weight. The dried pieces may then be cooled to about room temperature in a cooling tunnel and then packaged in moisture-proof bags. The jerky products may be bendable and flexible without breaking, exhibit a texture and rough appearance of jerky, and have a clearly defined shape and clearly defined logo embossed thereon.

EXAMPLE 2

A chicken-based jerky treat for canines may be produced as in Example 1 except emulsified or ground chicken meat may be substituted for the mechanically deboned beef of Example 1.

EXAMPLE 3

The ingredients and their relative amounts which may be used to produce a beef-based jerky canine snack are:

| Ingredients | Weight % |
|---|---|
| Mechanically Deboned Beef | 58.48 |
| Soy Grits, 80-0 | 12.50 |
| Brownulated Brown Sugar | 7.00 |
| MIRAGEL ™ Starch #463 | 7.00 |
| Sucrose | 6.00 |
| Seasoning Blend, Beef* | 5.36 |
| Smoke Flavor | 1.50 |
| Propylene Glycol | 1.50 |
| Liquid Lactic Acid | 0.50 |
| Sodium Nitrite (cure) | 0.16 |
| | 100.00 |

| *Seasoning Blend, Beef | Weight % |
|---|---|
| Salt | 37.27 |
| Dextrose | 29.82 |
| Guar Gum | 18.64 |
| Garlic Powder | 11.18 |
| Potassium Sorbate | 2.98 |
| Coloring | 0.07 |
| BHA | 0.04 |
| | 100.00 |

The mechanically deboned beef, supplied in frozen blocks of about 50 pounds each, may be conveyed into a meat grinder for comminuting into strands or ropes of frozen meat having a diameter of about 3/16 of an inch. The temperature of the frozen ground meat may be about 10° F. to about 30° F. and it may have a moisture content of about 70% by weight, and a fat content of about 17% by weight. The strands or ropes of frozen meat may be conveyed from the meat grinder to a steam-jacketed kettle. The kettle may be equipped with a mixing device having spring-loaded scrapper blades to prevent scorching of the meat as it is heated and mixed in the kettle. The frozen strands of meat may be mixed and heated in the kettle until it reaches a temperature of about 150° F. The browned meat containing denatured protein is slurry-like and may be pumped while hot to a Littleford jacketed mixer.

The cooked meat mass may be cooled in the jacketed mixer to a temperature of about 90° F. to about 100° F. The cold water soluble starch (MIRAGEL™ #463) may then be added to the cooled meat slurry with continued mixing to substantially completely hydrate the starch and form a substantially homogeneous mixture. Then the brown sugar, the sucrose, the beef seasoning preblend, and the sodium nitrite may be added with continued mixing. Next, the liquid ingredients which are the smoke flavor, propylene glycol, and liquid lactic acid may be added with continued mixing. Finally, the soy grits may be added and the mixture may be mixed to obtain a substantially homogeneous dough-like consistency. After addition of all of the ingredients, the temperature of the meat-based dough may range from about 85° F. to about 95° F. The cooled meat-based dough may have a moisture content of about 41% by weight, based upon the weight of the meat dough.

The meat dough may then be transferred to a kibbler for breaking any lumps which may be present in the dough. The dough may then be sheeted between counter-rotating rollers to obtain a dough sheet. The dough sheet may then be fed to the nip of the die roll and feed roll of a conventional rotary molder. The rotary molder may have a plurality of bone-shaped cavities or molds arranged along its length and around its circumference. The rotary molder forms the dough into bone-shaped pieces having a design embossed upon their surfaces.

The rotary molded pieces may then be conveyed in a monolayer pattern from the rotary molder to a baking oven or multi-zone dryer equipped with an open mesh continuous belt. Upon entering the baking oven the moisture content of the pieces may be about 40% to about 41% by weight, based upon the weight of the dough pieces. The pieces, arranged in rows, may be baked in the oven at a temperature of about 250° F. for about 7 minutes to reduce the moisture content of the pieces to about 26% by weight to about 28% by weight, based upon the weight of the pieces. The pieces, still arranged in monolayer form, may be transferred from the oven to a dryer where they are arranged in a multilayer bed. The pieces may be dried at a temperature of about 225° F. for about 40 minutes to about 50 minutes to obtain pieces having a water activity or relative humidity of about 0.63 to about 0.73 and a water content of about 16% by weight to about 19% by weight. The dried pieces may then be cooled to about room temperature in a cooling tunnel and then packaged in moisture-proof bags. The jerky products may be bendable and flexible without breaking, exhibit a texture and rough appearance of jerky, and have a clearly defined shape and clearly defined logo embossed thereon.

EXAMPLE 4

A chicken-based jerky treat for canines may be produced as in Example 3 except the ingredients and their relative amounts may be:

| Ingredients | Weight % |
| --- | --- |
| Emulsified Chicken Meat | 58.93 |
| Soy Grits, 80-0 | 12.60 |
| Sucrose | 11.08 |
| MIRAGEL ™ #463 | 7.05 |
| Seasoning Blend, Chicken* | 5.40 |
| Brownulated Brown Sugar | 2.01 |
| Propylene Glycol | 1.51 |
| Smoke Flavor | 0.76 |
| Liquid Lactic Acid (88%) | 0.50 |
| Sodium Nitrite (cure) | 0.16 |
| | 100.00 |

| *Seasoning Blend, Chicken | Weight % |
| --- | --- |
| Salt | 37.30 |
| Dextrose | 29.84 |
| Guar Gum | 18.65 |
| Garlic Powder | 11.19 |
| Potassium Sorbate | 2.98 |
| BHA | 0.04 |
| | 100.00 |

What is claimed is:

1. A method for the production of meat-based products, said method consisting essentially of:
   (a) comminuting meat comprising fat and having a moisture content of at least about 50% by weight to obtain comminuted meat,
   (b) heating said comminuted meat to a temperature of at least about 140° F. to denature the protein of the meat, thus forming a heated meat slurry,
   (c) cooling the heated meat slurry to solidify fat melted during the heating of the meat,
   (d) admixing the heated meat slurry with ingredients comprising a binding agent to obtain a dough having a moisture content greater than about 30% by weight, said binding agent compensating for the loss of cohesiveness due to said denaturing of the protein, said dough comprising at least about 50% by weight meat, based upon the total weight of the dough,
   (e) forming said dough into pieces, and
   (f) reducing the moisture content of said pieces to less than or equal to about 30% by weight, based upon the weight of said pieces.

2. A method as claimed in claim 1 wherein said heated meat slurry is cooled to a temperature of about 85° F. to about 100° F.

3. A method as claimed in claim 2 wherein said pieces are baked and/or dried to reduce the moisture content of the pieces.

4. A method as claimed in claim 3 wherein said pieces are baked and/or dried at a temperature of from about 230° F. to about 275° F.

5. A method as claimed in claim 4 wherein said baked and/or dried pieces are further dried at a temperature of from about 210° F. to about 235° F.

6. A method as claimed in claim 1 wherein the heated meat slurry is cooled while admixing with said ingredients.

7. A method as claimed in claim 1 wherein the heated meat slurry is cooled prior to admixing with said ingredients.

8. A method as claimed in claim 1 wherein said meat is at least substantially frozen when comminuted and consists essentially of mechanically deboned meat.

9. A method as claimed in claim 1 wherein said heating is conducted under vacuum to reduce the moisture content of the meat.

10. A method as claimed in claim 1 wherein said ingredients further comprise meat meal.

11. A method as claimed in claim 1 wherein said meat consists essentially of emulsified chicken.

12. A method as claimed in claim 1 wherein said binding agent comprises a starch and gum.

13. A method as claimed in claim 1 wherein said binding agent comprises a cold water soluble starch.

14. A method as claimed in claim 1 wherein said binding agent comprises a cold water soluble starch derived from corn starch and the amount of the binding agent is from about 2% by weight to about 12% by weight, based upon the weight of the dough.

15. A method as claimed in claim 1 wherein said dough is sheeted between counterrotating rollers and the sheeted dough is fed to a rotary molder to form said dough into said pieces.

16. A method as claimed in claim 1 wherein said dough is fed to a rotary molder by a spreading nozzle or sheeting nozzle to form said dough into said pieces.

17. A method as claimed in claim 1 wherein said dough is fed to the nip between the die roll and the forming roll of a rotary molder without feeding it to the feed roll of the rotary molder to form said dough into said pieces.

18. A method for the production of meat-based products comprising:
(a) comminuting at least substantially frozen meat having a moisture content of at least about 50% by weight to obtain at least substantially frozen comminuted meat,
(b) treating said at least substantially frozen comminuted meat to obtain dough pieces, said treatment consisting essentially of: heating said at least substantially frozen comminuted meat to a temperature of at least about 140° F. to denature the protein of the meat, thus forming a heated meat slurry,
cooling the heated meat slurry to a temperature of about 85° F. to about 100° F.,
admixing the heated meat slurry with ingredients comprising a cold water soluble starch to obtain a formable dough having a moisture content greater than about 30% by weight, said dough comprising at least about 50% by weight meat, based upon the total weight of the dough,
sheeting said dough to form a sheeted dough, and
forming said sheeted dough into pieces at a temperature of from about 70° F. to about 100° F., and then
baking or drying said pieces in a first stage, and
drying the pieces in a second stage to obtain a meat-based product having a water activity or relative humidity of less than about 0.85.

19. A method as claimed in claim 18 wherein said meat is heated to a temperature of about 145° F. to about 165° F.

20. A method as claimed in claim 18 wherein said pieces are baked or dried in said first stage to reduce the moisture content of the pieces to about 25% by weight to about 35% by weight, based upon the weight of the pieces.

21. A method as claimed in claim 20 wherein said pieces are baked or dried in said first stage at a temperature of from about 230° F. to about 275° F.

22. A method as claimed in claim 21 wherein said pieces are dried in said second stage at a temperature of from about 210° F. to about 235° F.

23. A method as claimed in claim 18 wherein the heated meat slurry is cooled while admixing with said ingredients.

24. A method as claimed in claim 18 wherein the heated meat slurry is cooled prior to admixing with said ingredients.

25. A method as claimed in claim 18 wherein said at least substantially frozen meat consists essentially of mechanically deboned meat.

26. A method as claimed in claim 18 wherein said heating is conducted under vacuum to reduce the moisture content of the meat.

27. A method as claimed in claim 18 wherein said ingredients further comprise at least one sugar and a soya component.

28. A method as claimed in claim 18 wherein said sheeted dough is fed to the nip between the die roll and the forming roll of a rotary molder without feeding it to the feed roll of the rotary molder.

29. A method for the production of meat-based products comprising:
(a) comminuting at least substantially frozen meat comprising fat and having a moisture content of at least about 50% by weight to obtain at least substantially frozen comminuted meat,
(b) treating said at least substantially frozen comminuted meat to obtain dough pieces, said treatment consisting essentially of: heating said at least substantially frozen comminuted meat to a temperature of at least about 140° F. to denature the protein of the meat, thus forming a heated meat slurry,
cooling the heated meat slurry to solidify fat melted during the heating of the meat,
admixing the heated meat slurry with ingredients comprising a cold water soluble starch and a gum to obtain a formable dough having a moisture content greater than about 30% by weight, said dough comprising at least about 50% by weight meat, based upon the total weight of the dough, and
forming said dough into pieces by rotary molding, and then
reducing the moisture content of said pieces to less than or equal to about 30% by weight, based upon the weight of said pieces, by continuously conveying said pieces through a continuous oven and/or continuous dryer.

30. A method as claimed in claim 29 wherein said heated meat slurry is cooled to a temperature of about 85° F. to about 100° F.

31. A method as claimed in claim 29 wherein the total amount of the cold water soluble starch and the gum is from about 2% by weight to about 12% by weight, based upon the weight of the dough.

32. A method as claimed in claim 31 wherein the weight ratio of said gum to said cold water soluble starch is from about 0.05–0.30:1.

33. A method as claimed in claim 32 wherein said gum is guar gum.

* * * * *